United States Patent [19]
Jones, Jr.

[11] Patent Number: 4,925,197
[45] Date of Patent: May 15, 1990

[54] PIVOTAL CREEPER

[76] Inventor: John W. Jones, Jr., 1220 Bethel Ave., Hampton, Va. 23669

[21] Appl. No.: 310,970

[22] Filed: Feb. 16, 1989

[51] Int. Cl.[5] ........ B62B 11/00
[52] U.S. Cl. ........ 280/32.6
[58] Field of Search ........ 280/32.6, 32.5, 79.4, 280/290, 87.021, 32.7, 79.2; 5/437, 440, 465

[56] References Cited

U.S. PATENT DOCUMENTS

| | | | |
|---|---|---|---|
| 1,298,381 | 3/1919 | Pace | 280/32.6 |
| 1,531,536 | 3/1923 | Benz | 280/32.6 |
| 1,721,508 | 7/1929 | Dahlberg | 280/32.6 |
| 3,044,797 | 7/1962 | Borland | 280/32.6 X |
| 3,374,000 | 3/1968 | Wetzel | 280/87.021 X |
| 3,377,085 | 4/1968 | Fralick | 280/79.2 X |
| 4,580,799 | 4/1986 | Quinonez | 280/32.6 |

*Primary Examiner*—Charles A. Marmor
*Assistant Examiner*—Alan M. Kagen
*Attorney, Agent, or Firm*—Wallace J. Nelson

[57] ABSTRACT

A creeper assembly having a first body portion 11 for supporting the hip and lower spine area of a mechanic and a second body portion 25 pivotally connected thereto, via a swivel joint, for supporting the upper spine, shoulder area and head, is disclosed. The swivel joint includes a clevis 36, tongue 19, ball bearing assembly 60 and connecting pin 38. The openings in clevis 36 and ball bearing journal 61 are provided with an inwardly directed key extension 47, 48 received by key slot 39 in connecting pin 38. Fork detent 40 engages stop pin 42 to limit the horizontal, pivotal movement between body portions 11 and 25. Outrigger mounted wheels 17 and 31 permit the use of larger, more durable support wheels. The swivel connection permits quick evasive movement of the head and shoulders by a mechanic, while working, to prevent or minimize injury and discomfort from being struck with dropped tools, dripping oil or dislodged dirt particles.

13 Claims, 1 Drawing Sheet

PIVOTAL CREEPER

BACKGROUND OF THE INVENTION

Creepers for use in work beneath automobiles are well known and have been used by the novice and professional automobile mechanic for years. The conventional one-piece creeper presently available may be adequate for most applications but this known structure does not permit quick movement of the head and shoulders of the mechanic to avert or dodge dropped tools, dripping oil or dirt particles dislodged from beneath the vehicle during work thereon. Also, presently employed creepers limit vertical movement of the mechanic's arms during work beneath a vehicle and restrict head and shoulder movement without moving the entire creeper assembly.

BRIEF DESCRIPTION OF THE INVENTION

There is thus a definite need in the art for improved mechanic's creeper that provides body support while permitting quick movement of the head to avoid possible injury from dropped tools and to minimize getting dirt and oil in the face.

It is therefore an object of the present invention to provide an improved mechanic's creeper formed of at least two segments connected for relative horizontal pivotal movement.

Another object of the present invention is a mechanic's creeper that supports the head, shoulders, hips and lower spine area of an individual and permits a quick diversion of the head and shoulders without moving the hip and lower spine area.

A further object of the present invention is a two-part creeper assembly having limited, horizontally pivotal, relative movement between the two parts.

An additional object of the present invention is a novel wheel system for a mechanic's creeper.

According to the present invention, the foregoing and additional objects are attained by providing a creeper assembly having a first body portion for supporting the hip and lower spine area of an individual, a second body portion for supporting the upper spine, shoulder area and head of the individual and a swivel joint releasably connecting the first and second body portions and permitting pivotal, horizontal, relative movement therebetween. The swivel joint includes a clevis member having a keyed opening aligned in the respective open ends thereof and carried by one of the body portions. A tongue is carried by the other body portion. A ball bearing assembly having a keyed journal and a circumferentially disposed raceway is secured within the tongue. An elongated pin, having a key slot extending the length thereof, extends through the clevis and ball bearing journal to releasably key-connect the two body portions while permitting relative, pivotal, horizontal movement therebetween. A fork element is carried on the bottom surface of one of the body portions and bears against a detent pin extending from the bottom surface of the other body portion to serve as a stop that limits the horizontal pivotal movement therebetween.

BRIEF DESCRIPTION OF THE DRAWINGS

A more complete appreciation of the invention and many of the attendant advantages thereof will be readily apparent as the same becomes better understood with reference to the following detailed description when considered in connection with the accompanying drawings wherein.

DETAILED DESCRIPTION OF THE PREFERRED EMBODIMENT

Figure 1:
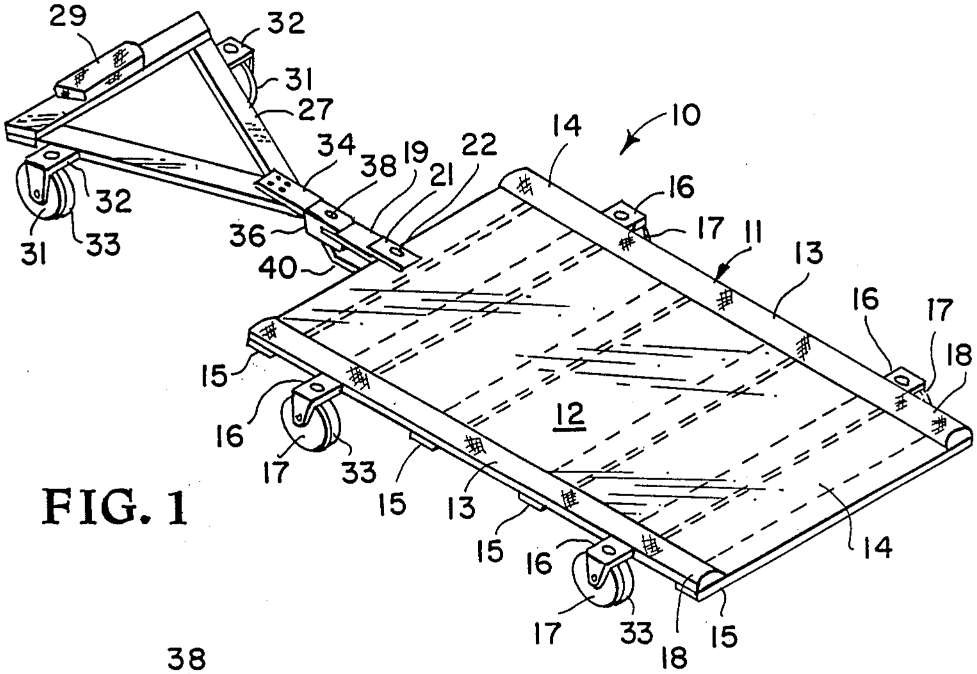
FIG. 1 is a perspective view of the two-part creeper assembly of the present invention.

Referring now to the drawings and more particularly to FIG. 1, the two-part creeper assembly of the present invention is shown and designated generally by reference numeral 10. Creeper assembly 10 includes a first body portion 11 having a support surface 12 secured to a rectangular frame 14. Frame 14 includes a pair of spaced longitudinally disposed sides 13 and a plurality of spaced cross-beams 15 attached to the longitudinally disposed sides and arranged at spaced intervals thereon. Four brackets 16 are attached to and extend from frame 14 for rotatably supporting outrigger wheels 17. Brackets 16 are connected to the longitudinal sides 13 and disposed on the same horizontal plane and spaced from the ends of frame 14.

Wheels 17 and 31 are provided with solid, soft rubber tires 33 that permit the wheels to easily roll over small obstacles such as small gravel, dropped nuts, bolts and the like. A suitable padding or cushioning covering 18 is releasably secured onto the length of sides 13. Padding 18 is formed of foam rubber, or the like, having a protective cover thereon that may be wiped clean to remove oil and dirt, as needed. Also, suitable snap fasteners, or other conventional attachment mechanism (not shown) permit removal and replacement of padding 18, when needed. A tongue member 19 is rigidly attached, intermediate an end cross-beam 15, to one end of first body portion 11 via U-clamp 21 and bolt 22.

A second body portion 25 has a triangular frame 27 and is provided with a cushioned head rest 29 attached intermediate to the base leg of the triangular frame. The cover for head rest 29 is also releasably attached (via suitable snap fasteners or the like, not shown) to frame 27 for replacement or removal thereof. Head rest 29 is provided with a soil resistant covering that may be wiped clean to remove any oil or dirt that may be thereon. A pair of outrigger type wheels 31, supported by brackets 32, extend from the apex legs of the triangular frame 27, and adjacent the base legs thereof. Brackets 32 are attached to body portion 25 such that they are level with or on the same horizontal plane as frame 27. An elongated metal bracket 34 is rigidly secured at one end thereof to the apex of triangular frame 27. The other end of bracket 34 has a bifurcated extension or clevis 36 rigidly connected thereto for releasably connection, via pin 38, with tongue member 19, as will be further explained hereinafter. A fork detent element 40 is rigidly attached to clevis 36 for contacting depending stop pin 42 (FIG. 2), as also will be further explained hereinafter.

Figure 2:
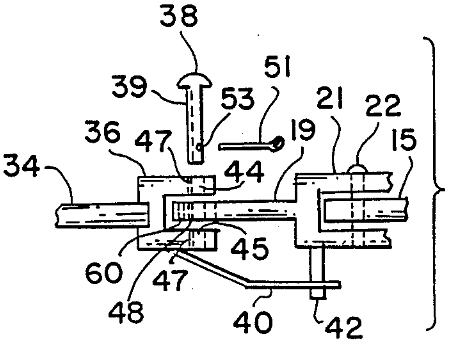
FIG. 2 is a part exploded, side view of the swivel connection between the creeper assembly shown in FIG. 1.
Figure 4:
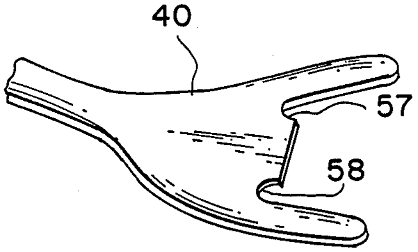
FIG. 4 is a perspective view of a fork device limiting horizontal pivotal movement between the two part creeper assembly bodies.

Referring now more particularly to FIG. 2, clevis 36 is provided with a pair of aligned openings 44,45. An elongated, square cross-sectional key extension 47 is provided on the surface of each opening 44,45 and extends the entire length of each opening 44,45. Pin 38 is provided with a keyway slot 39 extending the length thereof and serves to receive key extension 47 when inserted within openings 44,45. A cotter pin 51 is inserted within a transverse opening 53 for retaining pin 38 in position. Fork detent 40 depends rigidly from clevis 36 and, along with stop 42 prevents the horizontal pivotal movement between first and second bodies 11 and 25 from exceeding predetermined limits. Stop pin 42 is formed of spring steel or like material and is rigidly secured to and depending from U-clamp 21. When stop 42 engages either slot 57 or slot 58 in fork detent 40 (FIG. 4), the relative rotational or pivotal movement between bodies 11 and 25 is stopped.

Figure 3:
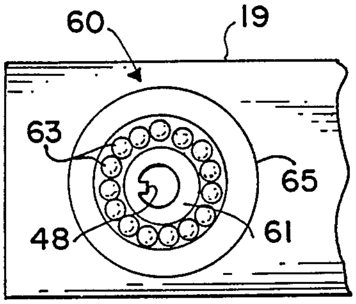
FIG. 3 is a part sectional view of the ball bearing assembly connection between the two-part creeper assembly.

As shown more particularly in FIG. 3, tongue member 19 is provided with a ball bearing assembly 60 therein to facilitate the pivotal movement between first body 11 and second body 25. Ball bearing assembly 60 is essentially the same thickness as tongue 19 and is fixedly disposed within an opening provided therein. A journal 61, having an internal elongated key extension 48 extending the length thereof, constitutes the center of ball bearing assembly 60. A plurality of steel balls or ball bearings 63 are disposed circumferentially adjacent journal 61 and retained therein by annular raceway housing 65. The entire ball bearing assembly is rigidly secured within the opening in tongue 19 by press-fit or other conventional securing technique. The cross-sectional area of internal key extension 48 within journal 61 is identical to that of key extension 47 in openings 44,45 of clevis 36, and is aligned therewith for receiving pin 38.

The operation of the invention is believed apparent from the above detailed description. When a mechanic is utilizing the two-part creeper assembly 10 while working under a car, and he drops a tool, or an oil drip or dirt particle is falling toward his face, he is able to quickly (thanks to the ball bearing swivel connection) rotate his head and shoulders to pivotally move body portion 25 and thereby prevent injury or discomfort. Also, the swivel connection enables the mechanic to move his head and upper body around to see obscured areas while permitting the lower body to remain stationary. The triangular frame 27 for body portion 25, permits additional clearance, mobility and vertical movement for the mechanic's arms since vertical elbow movement is not confined to the area above the creeper support surface, as experienced in conventional creeper devices. By employing outrigger supports on the same horizontal plane or level with frames 14 and 27, larger diameter and more easily rotatable wheels 17 and 31 may be utilized while maintaining the support surface 12 as close to the floor or ground as would be possible with much smaller wheels positioned beneath the support surface, and as now used on conventional creepers.

In the preferred embodiment wheels 17 and 31 are two and one-half inches in diameter, rectangular frame 14 is fifteen and one-half inches wide and has a length of twenty-six inches, triangular body 25 has a fifteen and one-half inch base and a vertical length of seventeen inches. For storage or transport of creeper assembly 10, pin 38 may be removed and bodies 11 and 25 separated.

Specific materials for the component parts and the specific structure for connecting the frame and other components of bodies 11 and 25 have not been discussed, and it is contemplated that any conventional metal, rigid plastics or wood components, as well as combinations thereof, may be employed for appropriate parts of the two-part creeper of the present invention. For example, support surface 12 may be formed of a single piece wood or rigid plastic or of individual wood slats, as so desired. When using metal-to-metal, metal-to-wood, or metal-to-plastic connections, it is to be understood that welding, bolting, riveting, or any other conventional attachment procedure may be employed for these connections, as so desired. Also, when connecting rigid plastic or wood parts to the same or different materials, the connections may be made by bolts, rivets or adhesive, as is conventional in the art.

Although the invention has been described relative to a specific embodiment thereof, it is not so limited and there are numerous variations and modifications that will be readily apparent to those skilled in the art in the light of the above teachings. For example, although wheels 17 and 31 have been described as having soft, solid rubber tires, these wheels could be made completely of rubber or other material and provided with any pliable external layer or coating, as so desired. Also, the tongue and clevis connections have been described and illustrated as being part of the first and second body portions, respectively, but these components would function equally as well if their locations were reversed.

Additional body cushioning structure could be added to frame 14, support surface 12 and to triangular frame 27, if so desired. Any cushioning material employed would be provided with a durable cover that could be wiped free of oil or other debris spilled thereon. Also, all cushioning employed would be releasably attached to the creeper frames by suitable snap fasteners or the like. Further, key slot 39 in pin 38 could be replaced with the extending keyway structure of clevis openings 44,45 and journal 61 and the key slot provided within these openings, without departing from the spirit and scope of the present invention.

It is therefore to be understood that the invention may be practiced other than as specifically described.

What is claimed as new and desired to be secured by Letters Patent of the United States is:

1. A creeper assembly for use by automotive repairmen when working beneath the vehicle comprising:

a first body portion for supporting the hip and lower spine area of an individual in the supine position;

a second body portion for supporting the upper spine, shoulder area and head of an individual in the supine position;

head rest means disposed on said second body portion in position to support the head of an individual disposed in the supine position on said creeper assembly;

a swivel joint pivotally and releasably connecting said first and said second body portions and permitting pivotal horizontal movement therebetween; and means for limiting the pivotal horizontal distance movement of said first and said second body portions.

2. The creeper assembly of claim 1 wherein said first body portion includes a rectangular frame, a plurality of cross-beam members attached to said rectangular frame and a support surface attached to said rectangular frame and said plurality of cross-beam members for supporting the hip and lower spine area of an individual.

3. The creeper assembly of claim 2 including a plurality of brackets, one of said plurality of brackets being disposed on each side of and in spaced adjacency to each end of said rectangular frame, each said bracket being secured to and extending along a horizontal plane from the sides of said rectangular frame, and a wheel member rotatably supported by each said bracket in outrigger relationship with the sides of said rectangular frame.

4. A creeper assembly for use by automotive repairmen when working beneath the vehicle comprising:

a first body portion for supporting the hip and lower spine area of an individual in the supine position;

a second body portion for supporting the upper spine, shoulder area and head of an individual in the supine position;

a swivel joint pivotally and releasably connecting said first and said second body portions and permitting pivotal horizontal movement therebetween;

means for limiting the pivotal horizontal distance movement of said first and said second body portions;

said swivel joint including a bifurcated clevis connected to an end of one of said body portions and an elongated tongue having one end received within the bifurcated clevis and the other end thereof secured to the other of said body portions, and a pin member extending through said clevis and said elongated tongue;

an annular ball bearing assembly disposed within and extending through the end of said tongue received within said bifurcated clevis, said ball bearing assembly having an annular journal and said bifurcated clevis being provided with an opening through each bifurcation and disposed in vertical alignment with said annular journal when said tongue is received by said clevis, a key extension internally disposed within the openings in said clevis and that of said annular journal, said pin member having a key slot extending the length thereof and mating with the key extension provided in said clevis and said annular journal, said pin member being received through the aligned openings in said annular journal and said clevis, a cotter pin extending through and retaining said pin member within said clevis and said journal to thereby releasably lock said first and second bodies in pivotal position.

5. A creeper assembly for use by automotive repairmen when working beneath the vehicle comprising:

a first body portion for supporting the hip and lower spine area of an individual in the supine position;

a second body portion for supporting the upper spine, shoulder area and head of an individual in the supine position;

a swivel joint pivotally and releasably connecting said first and said second body portions and permitting pivotal horizontal movement therebetween;

means for limiting the pivotal horizontal distance movement of said first and said second body portions;

said means for limiting the pivotal horizontal distance movement of said first and said second body portions including a fork detent element depending from and secured to one of said bodies and a stop pin depending from the other of said bodies, said fork detent element and said stop pin being constructed and arranged such that said stop pin engages a slot formed in said fork detent element when the relative pivotal movement of said first and second bodies reaches a predetermined distance and further relative movement between the bodies in that direction is prevented.

6. A creeper assembly for use by automotive repairmen when working beneath the vehicle comprising:

a first body portion for supporting the hip and lower spine area of an individual in the supine position;

a second body portion for supporting the upper spine, shoulder area and head of an individual in the supine position;

a swivel joint pivotally and releasably connecting said first and said second body portions and permitting pivotal horizontal movement therebetween;

means for limiting the pivotal horizontal distance movement of said first and said second body portions;

said second body portion including a triangular frame, said triangular frame having a base and a pair of apex legs extending from said base, a head rest disposed substantially intermediate the length of said base, a wheel bracket integrally secured in outrigger fashion to each of the apex legs of said triangular frame and adjacent said base, a wheel member depending from and rotatably supported by each said wheel bracket, an elongated bracket having one end thereof rigidly connected to the apex of said triangular frame and the other end of said elongated bracket forming a portion of said swivel joint.

7. The creeper assembly of claim 6 wherein said head rest is provided with a padded cushion having a durable surface thereon, and each said wheel bracket is disposed on a horizontal plane with said triangular frame.

8. A creeper assembly for use by automotive repairmen when working beneath the vehicle comprising:

a first body portion for supporting the hip and lower spine area of an individual in the supine position;

a second body portion for supporting the upper spine, shoulder area and head of an individual in the supine position, a swivel joint pivotally and releasably connecting said first and said second body portions and permitting pivotal horizontal movement therebetween;

means for limiting the pivotal horizontal distance movement of said first and second body portions;

said first body portion including a rectangular frame and said second body portion including a triangular frame, said rectangular frame and said triangular frame having body support surfaces thereon disposed in substantially the same horizontal plane, said triangular frame having a base and an apex, and structure extending from an end of said rectangular frame and from said apex of said triangular frame housing said swivel joint that connects said first and said second body portions.

9. The creeper assembly of claim 8 including a head rest positioned on said base of said triangular frame, first cushioning means releasably secured to said head rest and second cushioning means releasably secured to portions of said rectangular frame.

10. The creeper assembly of claim 8 including a plurality of brackets connected to and disposed in outrigger fashion and on a horizontal plane with said rectangular frame and said triangular frame, and a wheel member rotatably secured to each of said plurality of brackets.

11. The creeper assembly of claim 10 including a solid, soft rubber tire provided on each said wheel member to permit said creeper to easily roll over small objects.

12. The creeper assembly of claim 10 wherein said plurality of brackets includes four brackets on said rectangular frame, said four brackets being disposed adjacent the four corners of said rectangular frame.

13. The creeper assembly of claim 10 wherein said plurality of brackets includes two brackets on said triangular frame, said two brackets being disposed adjacent said base and attached, one each to the portions of said triangular frame forming said apex.

* * * * *